United States Patent
Feng

(10) Patent No.: US 7,181,082 B2
(45) Date of Patent: Feb. 20, 2007

(54) BLUR DETECTION SYSTEM

(75) Inventor: Xiao-fan Feng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 795 days.

(21) Appl. No.: 10/323,112

(22) Filed: Dec. 18, 2002

(65) Prior Publication Data

US 2004/0120598 A1 Jun. 24, 2004

(51) Int. Cl.
*G06K 9/40* (2006.01)
*G02B 7/04* (2006.01)
*G02B 27/40* (2006.01)
*G02B 27/64* (2006.01)

(52) U.S. Cl. .................... 382/255; 382/261; 382/263; 250/201.2

(58) Field of Classification Search ............. 382/255, 382/261, 263; 250/201.2; 348/354–356; 396/77
See application file for complete search history.

(56) References Cited

U.S. PATENT DOCUMENTS

| | | | |
|---|---|---|---|
| 5,105,278 A * | 4/1992 | Takemoto | 348/356 |
| 5,341,170 A * | 8/1994 | Takemoto | 348/354 |
| 5,561,611 A | 10/1996 | Avinash | |
| 5,694,484 A | 12/1997 | Cottrell et al. | |
| 5,842,059 A * | 11/1998 | Suda | 396/101 |
| 6,154,574 A | 11/2000 | Paik et al. | |
| 6,166,384 A * | 12/2000 | Dentinger et al. | 250/370.09 |
| 6,222,881 B1 | 4/2001 | Walker | |
| 6,298,145 B1 * | 10/2001 | Zhang et al. | 382/103 |
| 2003/0026495 A1 * | 2/2003 | Gondek et al. | 382/261 |

OTHER PUBLICATIONS

Konnai et al. ("Method of Capturing Image of Object Passing through Focus Area," Proc. SPIE vol. 4038, 2001, pp. 86-94).*

* cited by examiner

*Primary Examiner*—Jingge Wu
*Assistant Examiner*—Yubin Hung
(74) *Attorney, Agent, or Firm*—Chernoff, Vilhauer, McClung & Stenzel

(57) ABSTRACT

A system of estimating and reducing image blur in digital images stored in a digital file as a sequence of DCT coefficients arranged in a plurality of blocks. The disclosed system may preferably calculate one or more blur indicators from selected ones of the sequence of DCT coefficients and selectively filter a digital image based upon the calculated one or more blur indicators.

12 Claims, 4 Drawing Sheets

|  | Low ← Horizontal → high | | | | | | | |
|---|---|---|---|---|---|---|---|---|
| low | C00 | C01 | C02 | C03 | C04 | C05 | C06 | C07 |
| ↑ | C10 | C11 | C12 | C13 | C14 | C15 | C16 | C17 |
| | C20 | C21 | C22 | C23 | C24 | C25 | C26 | C27 |
| Vertical | C30 | C31 | C32 | C33 | C34 | C35 | C36 | C37 |
| | C40 | C41 | C42 | C43 | C44 | C45 | C46 | C47 |
| ↓ | C50 | C51 | C52 | C53 | C54 | C55 | C56 | C57 |
| High | C60 | C61 | C62 | C63 | C64 | C65 | C66 | C67 |
| | C70 | C71 | C72 | C73 | C74 | C75 | C76 | C77 |

FIG. 3

Standard deviation of DCT coefficients for a non-blur image

| 156.16 | 52.78 | 30.04 | 18.53 | 12.20 | 7.97 | 4.42 | 2.98 |
|---|---|---|---|---|---|---|---|
| 62.06 | 27.84 | 17.48 | 11.09 | 7.19 | 4.56 | 2.96 | 2.32 |
| 35.80 | 19.49 | 13.78 | 9.38 | 5.47 | 3.42 | 2.68 | 2.19 |
| 23.66 | 13.68 | 10.13 | 7.05 | 3.77 | 2.48 | 2.22 | 1.88 |
| 16.17 | 8.98 | 6.58 | 4.12 | 2.84 | 2.09 | 1.78 | 1.92 |
| 10.50 | 6.02 | 4.22 | 3.04 | 2.25 | 1.92 | 1.68 | 1.53 |
| 6.29 | 4.04 | 3.16 | 2.19 | 1.91 | 1.58 | 1.40 | 1.58 |
| 4.21 | 2.66 | 2.33 | 2.01 | 1.80 | 1.47 | 1.48 | 1.48 |

FIG. 4

Standard deviation of DCT coefficients for a blur image

| 148.01 | 37.63 | 12.99 | 6.89 | 4.22 | 2.30 | 1.92 | 1.46 |
|---|---|---|---|---|---|---|---|
| 42.55 | 14.46 | 6.62 | 3.74 | 2.40 | 2.03 | 1.64 | 1.32 |
| 16.44 | 7.18 | 4.35 | 2.61 | 1.75 | 1.75 | 1.42 | 1.22 |
| 7.97 | 4.04 | 2.80 | 1.91 | 1.85 | 0.91 | 0.61 | 1.15 |
| 5.01 | 2.68 | 1.85 | 1.86 | 1.57 | 0.62 | 0.51 | 1.11 |
| 2.72 | 1.79 | 1.82 | 1.57 | 0.64 | 0.47 | 0.52 | 0.44 |
| 2.14 | 1.74 | 1.52 | 0.67 | 0.52 | 0.57 | 0.47 | 0.43 |
| 1.60 | 0.90 | 0.71 | 0.59 | 0.62 | 0.43 | 0.43 | 0.47 |

FIG. 5

BLUR DETECTION SYSTEM

BACKGROUND OF THE INVENTION

The present invention relates to the processing of digital images, and specifically, to a system for estimating and/or reducing the amount of image blur in digital images.

Digital representation of an image presents a wide array of advantages over analog representation of images, e.g. negative film, positive slide, etc. Digital images, for example, may be electronically stored, transmitted, and copied without degradation of the image. Digital images of objects and events may be captured by traditional devices such as a digital camera, scanned from a negative or picture by a scanner or may be computer-generated. Digital images may also be digitally processed and manipulated to change image characteristics such as color and contrast, or reduce defects or artifacts in the image, such as red-eye from a camera flash or image blur.

Image blur is one of the most important factors in the perception of image quality due to the attendant loss of image detail and sharpness. Image blur may be the result of a number of things, including for example, camera lenses not focused on the subject, aperture blur of the foreground and/or the background, relative motion of the subject with respect to the camera, and even atmospheric haze. Image blur in traditional, analog images such as color photographs historically could not be perceptibly reduced. Image blur in digital images, however, can be perceptibly reduced. Existing processing techniques for reducing image blur typically include both a blur estimation component and a blur reduction component. If the blur estimation component detects image blur beyond a predetermined threshold, the image is processed by the blur reduction component. Some existing processing techniques for reducing image blur quantify the image blur and adjust the correction accordingly. Other techniques for reducing image blur employ an iterative process that repeatedly cycles the image through the blur reduction component until the estimated amount of image blur is below the predetermined threshold.

One existing system of estimating image blur is done in the spatial domain. In this system, sharp edges are used to generate a point-spread function and the amount of image blur is estimated from this function. A frequent problem encountered with this system is that many real-world images lack sufficiently sharp edges to reliably estimate image blur.

Another system of estimating image blur estimates the amount image blur from the power spectrum of the image in the frequency domain. This system takes advantage of the assumption that the power spectrum of most real-world, non-blurred images is relatively invariant where the power at non-zero frequencies is generally inversely proportional to the square of frequency. Blurred images, conversely, exhibit a characteristic where the power falls more rapidly as frequency increases. This phenomenon is illustrated in FIG. 1, which shows the power spectrum of both a blurred image and a non-blurred image. As can be seen from FIG. 1, the power of the blurred image is approximately equal to that of the non-blurred image at very low frequencies, but quickly drops below that of the non-blurred image at frequencies greater than approximately 0.05 cycles/sample. Because they uses scene statistics, systems that estimate image blur from the power spectrum of the image are generally considered to be more reliable than systems that estimate image blur from a point spread function derived from image structure, such as sharp edges. Systems that estimate image blur from the power spectrum of the image, however, are computationally complex, making implementation difficult in many applications, such as a photo printer.

Yet another system for estimating image blur is disclosed by Zhang et al., U.S. Pat. No. 6,298,145 B1. This system estimates the amount of image blur in a digital image from a weighted occurrence histogram of all non-zero DCT coefficients contained in the digital image file that stores the digital image. As stated in this reference, however, this system "does not use the [DCT] coefficients directly since their values are closely related to the type of image they depict." Instead, the DCT components are used to construct the aforementioned occurrence histogram, which must then be mathematically manipulated, adding computational complexity.

What is desired, then, is a computationally efficient system for estimating and/or reducing image blur.

BRIEF DESCRIPTION OF THE DRAWINGS

FIG. 3 shows a typical 2D DCT coefficient block arranged in a grid of increasing vertical and horizontal frequency.

FIG. 4 is a table showing the standard deviation of DCT coefficients in a block of a non-blurred image.

FIG. 5 is a table showing the standard deviation of DCT coefficients in a block of a blurred image.

DETAILED DESCRIPTION OF THE PREFERRED EMBODIMENTS

Figure 1:
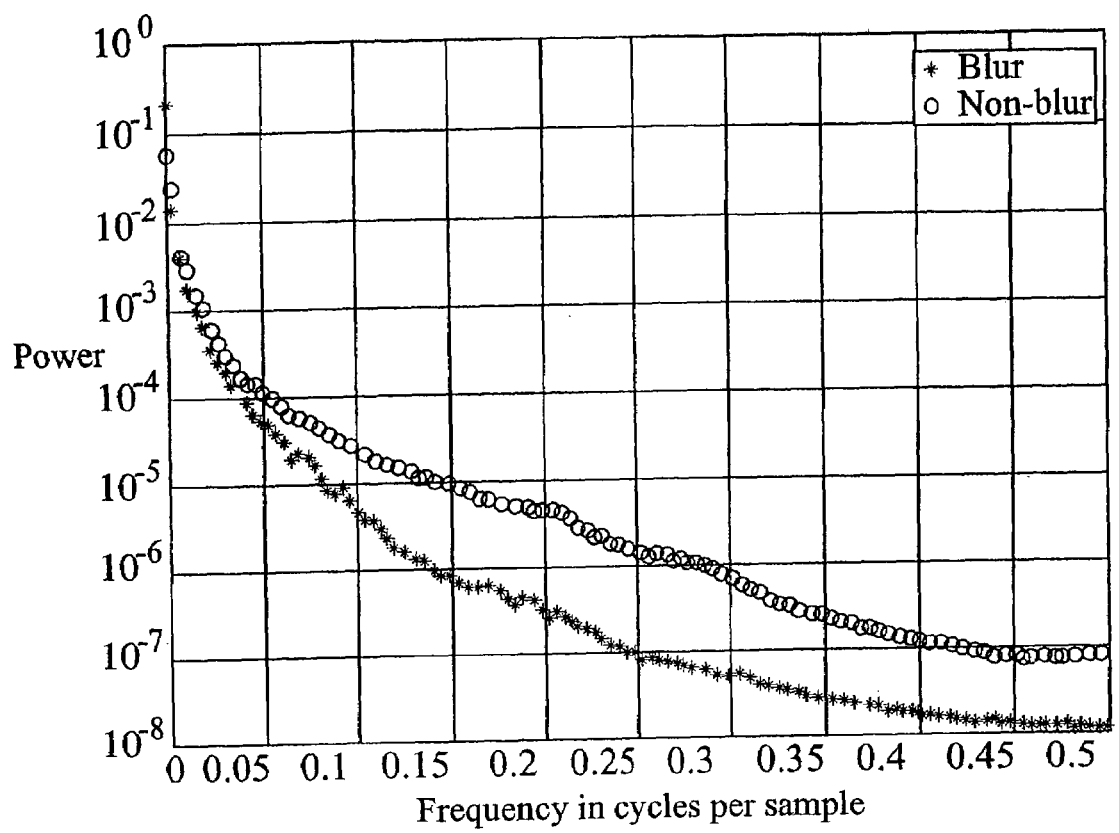
FIG. 1 shows the respective power spectrums of a blurred image and a non-blurred image.
Figure 2:
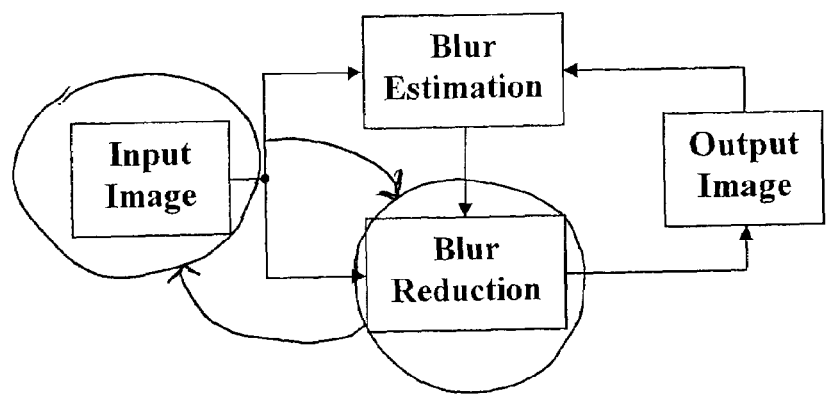
FIG. 2 shows a typical blur estimation and reduction process.

FIG. 2 illustrates a typical blur estimation and reduction system where an input image is sent to a blur estimation module to determine if blur exists, and if so, estimate the amount of blur. A blur reduction module determines whether to apply a blur reduction process, and if so, how much blur to reduce. The process may be iterative, if desired, such as repeatedly processing the input image through the blur estimation and reduction system until a blur threshold is reached.

Most digital images are stored in image formats that encode an image using the forward discrete cosine transform (DCT) function $$F(u, v) = \frac{2}{n} C(u) C(v) \sum_{k=0}^{n-1} \sum_{l=0}^{n-1} f(k, l) \cos\left[\frac{(2k+1)u\pi}{2n}\right] \cos\left[\frac{(2l+1)v\pi}{2n}\right]$$

and decode an image using the inverse DCT transform function $$f(k, l) = \frac{2}{n} \sum_{u=0}^{n-1} \sum_{v=0}^{n-1} C(u) C(v) F(u, v) \cos\left[\frac{(2k+1)u\pi}{2n}\right] \cos\left[\frac{(2l+1)v\pi}{2n}\right]$$

The forward DCT transform converts pixel information of a digital image in the spatial domain to energy, or power information in the frequency domain. Converting a digital image to the frequency domain allows the image to be compressed significantly, saving storage space. By way of illustration, a black and white digital image stored in the spatial domain requires that every pixel be encoded with a number, of arbitrary bit-length, that represents the pixel's shade on a gray-scale. For convenience, digital images are usually organized into 8×8 blocks of pixels when stored in a digital image file. Thus if an 8-bit gray-scale is used to store pixel information of a black and white image in a digital image file, the digital image file will comprise a series of numbers, organized into sequential 8×8 arrays, each number valued between 0 and 255, and representing the shade of their corresponding pixels. This requires a good deal of storage space to store. If higher bit-lengths are used, even greater space is required.

Color images stored in the spatial domain require even more storage space because each pixel may be represented by three components (or any number) to properly preserve the color information of the pixel, such as [R, G, B] or [L, Cr, Cb]. For example, if a 24-bit Y, Cr, Cb digital image file stores a color image, the digital file will comprise three separate series of 8×8 arrays, each series representing one component of the chosen color coordinate system. Each number in each array will be an 8-bit number, 0 to 255, representing the shade of its corresponding color coordinate for its corresponding pixel.

The forward DCT transform converts each array from pixel information in the spatial domain into energy information in the frequency domain at discrete vertical and horizontal frequency components, respectively. Like image formats that store images in the spatial domain, image formats that store images in the frequency domain typically organize the power information of an image into 8×8 blocks. In other words, the power information of an image may be stored at eight discrete vertical frequency components and eight discrete horizontal frequency components, graphically represented in the 8×8 grid shown in FIG. 3. The C00 term 10 shown in FIG. 3 represents the DC frequency component of the image, i.e. image power at both zero horizontal and vertical frequency. The C07 term 12 represents the power of an image at zero vertical frequency and the highest horizontal frequency, while the C70 term 14 represents the power of an image at zero horizontal and the highest vertical frequency. The C77 term 16 represents the power of an image at both the highest vertical frequency and the highest horizontal frequency.

Digital images encoded in the frequency domain can be more easily compressed because the vast majority of the energy, or power, within real-world images is contained in the low frequency blocks. Accordingly, if the digital image file were to discard image information at high vertical and horizontal frequencies, the image could still be decoded into the spatial domain for display while retaining most of the image's detail. One commonly used digital image format that uses a forward DCT transform to characterize an image is the JPEG format, though other digital image formats use this transform as well. The JPEG format is commonly used to characterize an image because it allows the image to be compressed dramatically without significant loss of image quality.

The forward DCT transform set forth above is markedly similar to the continuous Fourier transform used in power spectrum analysis. From this fact, the present inventor deduced that, just as the amount of image blur may be estimated from the power spectrum of an image, the image blur should also be discernible from the DCT information already embedded in most compressed digital image files. Thus the computational complexity involved in performing a power spectrum analysis should be avoidable when estimating image blur in a digital image that includes DCT coefficients.

Figure 6:
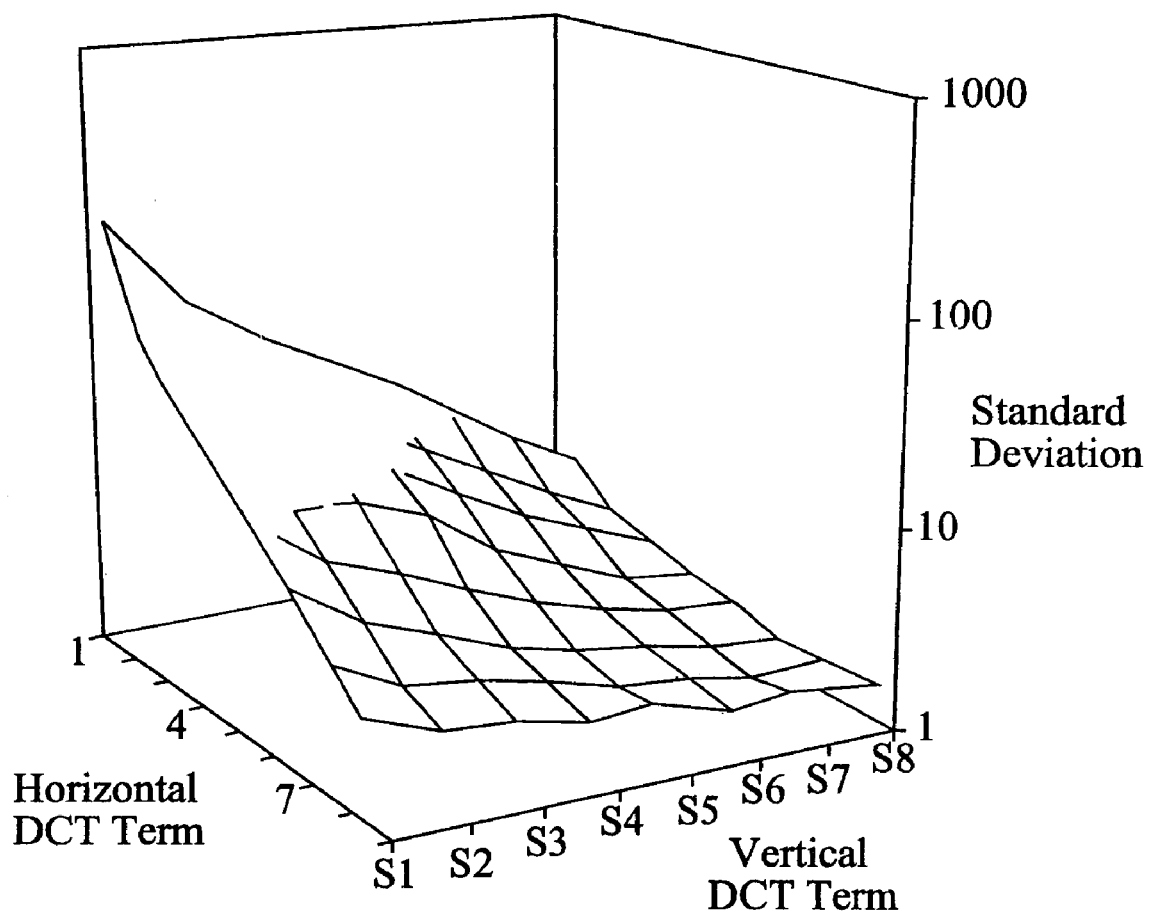
FIG. 6 is shows a surface representing the standard deviation of DCT coefficients in an image as a function of vertical and horizontal DCT components.

With this idea, the present inventor determined that there was indeed a variety of information already embedded within the digital image file that could be used to estimate the amount of image blur in a digital image. As an example, FIGS. 4 and 5 show one such measure of image blur, referred to as a "blur indicator." FIG. 4 is a table that shows the standard deviation of DCT values at each frequency for a non-blurred image as a result of processing a plurality of blocks. FIG. 5 is a table that shows the standard deviation of DCT coefficients at each frequency for a blurred image as a result of processing a plurality of blocks. As can be observed from a comparison of these two tables, the standard deviations of the blurred and the non-blurred images at low frequencies are approximately the same. However, as frequency increases in both the vertical and horizontal components, the standard deviation values for the blurred image fall more dramatically than those of the non-blurred image. Thus the standard deviation of DCT coefficients in a digital image file may be used effectively as a blur indicator. Other indicators that have been found to effectively estimate image blur include maximum DCT coefficients, minimum DCT coefficients, variance, and kertosis. In addition, image blur may be estimated from the sum of the standard deviations of the coefficients in an image block, graphically represented in FIG. 6 as the volume underneath the surface that represents the standard deviation of DCT coefficients as a function of the 2-dimensional (horizontal and vertical) DCT frequency components.

A blur indicator may be a single DCT coefficient (raw or modified), a set of DCT coefficients (raw or modified), or a comparison of one or more DCT coefficients to other DCT coefficients (raw or modified). IN any case, the change in the magnitude of the DCT coefficients, other than zero or nonzero, may result in a change in the blur estimation and or reduction.

It should be noted that in typical digital image formats, such as JPEG, a digital image file may contain many blocks of DCT coefficients where each block corresponds to pixel information in the spatial domain for a spatial portion of the image. Thus, with the selection of an appropriate blur indicator from one or more sets of DCT coefficients (either "raw" or statistically modified) from different spatial portions of the image, the technique permits the detection of image blur in individual regions of the image. This is a powerful tool, as many images are intended to be focused on a subject in one portion of the image, while the remainder of the image is blurred. A blur indicator that may be used to indicate whether any region in the image is not blurred is the maximum DCT coefficient in a digital image at a given frequency. With the ability to examine individual regions of an image, comprising one or more blocks of DCT coefficients for the presence of blur, such partially blurred images can be identified so they are not inadvertently modified.

Figures 7, 8:
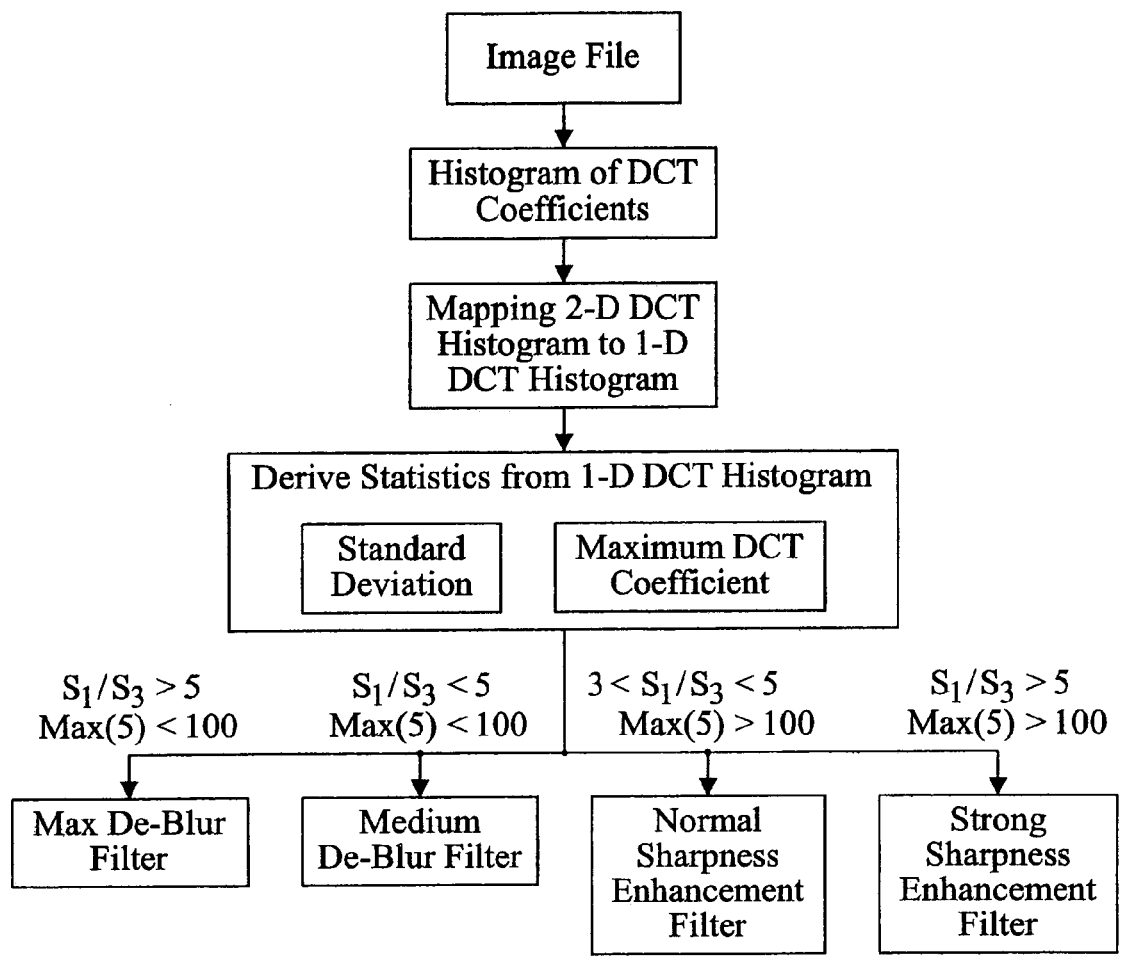
FIG. 7 shows one exemplary method that incorporates the present invention.
FIG. 8 shows an exemplary mapping function that may be used in conjunction with the present invention.

FIG. 7 illustrates one example of a blur estimation and reduction technique. In this example, a two-dimensional ("2D") histogram is constructed from the digital image file such that each DCT coefficient in the image file is associated with its corresponding frequency component, where the frequency component is two-dimensional, i.e. it indicates both the vertical and horizontal frequency value.

Each image block in the digital image file may contain 64 coefficients that correspond to the two-dimensional (8×8) DCT frequency components illustrated in FIG. 3. The two-dimensional histogram organizes each of the DCT coefficients in the image file according to the particular two-dimensional frequency component with which it is associated. Most digital image encoding schemes, such as JPEG, further modify the DCT coefficients after they are calculated from the forward DCT transform. JPEG, for example, quantizes the respective DCT coefficients in each block according to a quantization table (Q-table) and then encodes the values with a Huffman encoding scheme in order to provide more efficient compression. Accordingly, when a JPEG file is being used in this process, the Huffman coding and quantization should be removed before the two-dimensional histogram is obtained.

This 2D histogram may then be reduced to a one-dimensional ("1D") histogram generally equivalent to a radial frequency power spectrum. The 2D histogram may be reduced to a 1D histogram according to a mapping function. FIG. 8 shows one suitable mapping function. As can be seen in FIG. 8, the 64 DCT frequency components are divided into a plurality of groups (e.g. 0 to 7) according to their position in the block. The groups may be roughly organized into concentric regions about the DC frequency component. The regions in this particular mapping function are selected because it has generally been observed that, in a given image block, each of the DCT coefficients within these regions have values close to one another. One technique to reduce the two-dimensional histogram to a one-dimensional histogram is for a plurality of the DCT coefficients corresponding to each region in a given image block to be averaged together to provide a median value. Alternatively, one value within each region may simply be selected to represent the value for that region. Essentially, this reduces the two-dimensional histogram to a one-dimensional histogram, or otherwise reduce the quantity of data, where the values 0 to 7 generally represent radially increasing frequency components.

The steps just described may be reversed. That is to say, as each image block is read from the digital image file, the mapping function shown in FIG. 8 may be used to first reduce the block to one dimension by obtaining median values for each region 0 to 7. A one-dimensional histogram may then be constructed as additional image blocks are read, reduced, and their median values categorized into their associated regions.

Preferably the selection of different sets of DCT coefficients are non-overlapping, though they may be partially overlapping, if desired. The sets preferably include different frequency components, such as a higher frequency and a lower frequency. The different frequency values readily permit a comparison of the change in magnitude as a function of the frequency.

From the one-dimensional histogram, one or more blur indicators may be obtained. A first blur indicator that may be used is the maximum DCT coefficient in region 5 (Or any other region or coefficient). The present inventor has determined that a threshold of 100 in this region for the first blur indicator is a suitable indicator for blur of an image obtained from a digital camera. By testing whether the maximum DCT coefficient is less than a threshold, it can be reliably determined whether any portion of the image is in focus. In other words, if the maximum DCT coefficient within region 5 is less than 100, the entire image will typically be blurred. Conversely, if the maximum DCT coefficient within region 5 is greater than 100, then it is likely that at least a portion of the image is in focus.

A second blur indicator that may be used is the ratio of the standard deviation of the first region to the standard deviation of the third region (or any other comparison between two or more regions). The standard deviation of DCT coefficients in blurred images tend to fall more rapidly as frequency increases than do non-blurred images. Thus a relatively high ratio indicates a blurred image, while a relatively low ratio indicates a focused image. The inventor has determined that a threshold of 5 for this blur indicator is an appropriate measure of image blur for an image from a digital camera. Because the measure of standard deviation averages information over the entire image, this blur indicator will not tend to detect isolated portions of the image that are in focus, but instead will tend to measure the overall image blur.

Though the aforementioned technique uses the maximum DCT coefficient in region 5 as a first blur indicator, and the ratio of the standard deviation of the region 1 DCT coefficient to the region 3 DCT coefficient as a second blur indicator, other techniques may use other blur indicators from other regions. Similarly, other statistical values, such as the minimum coefficient value, etc., may be used as blur indicators as well. Also, though the described technique calculates the blur indicators from a one-dimensional histogram, the blur indicators may be derived without a histogram. For example, the selected blur indicators may be the maximum region 5 coefficient and the ratio of the average region 1 coefficient to the average region 3 coefficient. In this instance, each of these blur indicators can simply be calculated and updated as data is read from the digital image file.

From the two blur indicators shown in FIG. 7, different estimates of blur may be calculated. First, if the first blur indicator is less than 100 and the second blur indicator is greater than 5 then the entire image is likely to be considerably blurred. If this condition exists then a maximum de-blur filter may be applied to enhance the image.

Second, if the first blur indicator is less than 100 and the second blur indicator is less than 5, then the entire image is likely to be marginally blurred. In this instance a medium de-blur filter may be applied to enhance the image.

Third, if the first blur indicator is greater than 100 and the second blur indicator is less than 5 but greater than 3, then the image is likely focused upon an object within the image, but the image marginally lacks sharpness. A normal sharpness enhancement filter may then be applied to enhance the image.

Fourth, if the first blur indicator is greater than 100 and the second blur indicator is greater than 5, then the image significantly lacks sharpness and a strong sharpness enhancement filter may be applied. The filters described in this paragraph are well known, and their design is straightforward to those skilled in the art. Though FIG. 7 indicates that the technique terminates after application of one of the four described filters, it is also possible to repeat the process with the corrected image to see whether further blur correction may be needed.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of detecting and correcting blur in a digital image stored in a digital file as a sequence of DCT coefficients arranged in a plurality of blocks representing a grid of frequency components, each said block representing a portion of said image, said method comprising:
    (a) reading a plurality of DCT coefficients from said sequence of DCT coefficients, said plurality of DCT coefficients comprising at least two DCT coefficients from each of said plurality of blocks;
    (b) calculating from said plurality of DCT coefficients a first blur indicator that quantifies the amount of blur in the block having the least amount of blur among all of said plurality of blocks;
    (c) calculating from said plurality of DCT coefficients a second blur indicator that quantifies the amount of blur throughout said digital image; and
    (d) selectively applying a filter to said digital image based upon the value of said first blur indicator and said second blur indicator.

2. The method of claim 1 where the filter applied to said digital image is one of a plurality of differing types of filters.

3. The method of claim 1 including the step of selecting a representative frequency component in said grid and where said first blur indicator is the maximum valued DCT coefficient at said frequency component over all of said blocks in said image.

4. The method of claim 1 including the step of selecting two representative frequency components in said grid, calculating the standard deviation of said DCT coefficients over said image at said two representative frequency components, and where said second blur indicator is the ratio of said standard deviations.

5. The method of claim 1 including the steps of:
    (a) dividing said grid of frequency components into a plurality of regions of increasing frequency;
    (b) summarizing the DCT coefficients in each of said plurality of regions for each of said blocks;
    (c) calculating said first blur indicator and said second blur indicator from said summary.

6. The method of claim 5 where said step of summarizing the DCT coefficients in each of said plurality of regions comprises obtaining an average value of the DCT coefficients in each of said plurality of regions.

7. The method of claim 6 where said first blur indicator is the maximum average value at a selected one of said plurality of regions.

8. The method of claim 6 including the step of obtaining the standard deviation of DCT coefficients at each of a selected two of said plurality of regions.

9. The method of claim 8 where said second blur indicator is the ration of said standard deviations.

10. A method of detecting and correcting blur in a digital image stored in a digital file as a sequence of DCT coefficients arranged in a plurality of blocks representing a grid of horizontal and vertical frequency components, each said block representing a portion of said image, said method comprising:
    (a) obtaining a two-dimensional histogram that associates DCT coefficients with respective discrete vertical and horizontal frequency component combinations;
    (b) summarizing said two-dimensional histogram with a one-dimensional histogram that associates DCT values with respective radial frequency components;
    (c) calculating at least one blur indicator from said one-dimensional histogram; and
    (d) selectively applying a filter to said digital image based upon said at least one blur indicator;
    (e) where said one-dimensional histogram is obtained by dividing said two-dimensional histogram into a plurality of regions of generally increasing frequency and averaging the DCT coefficients within each region for each of said blocks;
    (f) where said blur indicator is the ratio of a average DCT values of a selective two of said regions.

11. A method of detecting and correcting blur in a digital image stored in a digital file as a sequence of DCT coefficients arranged in a plurality of blocks representing a grid of horizontal and vertical frequency components, each said block representing a portion of said image, said method comprising:
    (a) obtaining a two-dimensional histogram that associates DCT coefficients with respective discrete vertical and horizontal frequency component combinations;
    (b) summarizing said two-dimensional histogram with a one-dimensional histogram that associates DCT values with respective radial frequency components;
    (c) calculating at least one blur indicator from said one-dimensional histogram; and
    (d) selectively applying a filter to said digital image based upon said at least one blur indicator;
    (e) where said one-dimensional histogram is obtained by dividing said two-dimensional histogram into a plurality of regions of generally increasing frequency and averaging the DCT coefficients within each region for each of said blocks;
    (f) further including a first blur indicator and a second blur indicator;
    (g) where said first blur indicator is the maximum average DCT coefficient within a selective one of said regions and said second blur indicator is the ratio of a average DCT values of a selective two of said regions.

12. The method of claim 11 where said filter is selected from a plurality of different types of filters based upon said first blur indicator and said second blur indicator.

* * * * *

UNITED STATES PATENT AND TRADEMARK OFFICE
CERTIFICATE OF CORRECTION

PATENT NO. : 7,181,082 B2                                Page 1 of 1
APPLICATION NO. : 10/323112
DATED : February 20, 2007
INVENTOR(S) : Feng It is certified that error appears in the above-identified patent and that said Letters Patent is hereby corrected as shown below:

Column 5, line 26 - change "DC frequency" to --DCT frequency--

Column 7, line 52 - change "ration" to --ratio--

Signed and Sealed this

Tenth Day of June, 2008

JON W. DUDAS
*Director of the United States Patent and Trademark Office*